Feb. 3, 1959

T. A. JOHNSON 2,871,774

PROCESS OF FORMING FLOORING SURFACES WITH
ASPHALT COATED RUBBER PELLETS

Filed Feb. 24, 1955

INVENTOR.
THOMAS A. JOHNSON
BY
Robert Irving Williams
ATTORNEY

United States Patent Office

2,871,774
Patented Feb. 3, 1959

2,871,774

PROCESS OF FORMING FLOORING SURFACES WITH ASPHALT COATED RUBBER PELLETS

Thomas A. Johnson, Newfane, N. Y., assignor to U. S. Rubber Reclaiming Co., Inc., Buffalo, N. Y., a corporation of New York Application February 24, 1955, Serial No. 490,357

4 Claims. (Cl. 94—23)

This invention relates to processes for the formation of non-abrasive playground and other floorings with asphalt-coated rubber pellets.

This application is a continuation-in-part of my co-pending application, Serial No. 444,535, filed July 20, 1954, now abandoned.

Many attempts have been made to produce safe play areas from rubber and from rubber-asphalt mixtures. Most of these attempts have been expensive or have failed to remain effective. When ordinary rubber pellets—such as ground fabric-free scrap rubber—have been used, failure has been due to the excessive absorption of the asphalt or a fraction thereof by the particles of rubber, leaving an asphalt material and/or a rubber material with very poor adhesive qualities. Another difficulty has been that the particle-size employed has exposed too much surface to scuffing, and thereby multiplied the effective force tending to remove the particle from its matrix. The present invention in various of its aspects contemplates the provision of asphalt-treated pellet-like particles of rubber, the use of such particles in the formation of playing-surface bases, the use of small-sized particles, and the reduction of absorption of the asphalt or a fraction thereof thru the use of ground scrap rubber which has been treated with an asphalt of somewhat higher melt-point than that of the matrix material. Fiber-free scrap is preferable; but any scrap may be used, altho more coating or penetration-plus-coating asphalt will be required when fiber is present.

Pursuant to the invention in certain of its broader aspects, the particles of scrap rubber may be pre-treated with asphalt in any of a variety of manners. Pursuant to the invention in certain of its more specific aspects, the particles may be treated while being agitated, as in an upwardly-inclined screw conveyor, and under conditions such that they are maintained substantially as discrete particles.

The rubber particles should be of such size as to pass a three-mesh screen, and preferably such as to pass an eight-mesh screen. Minus thirty-mesh scrap may be used for a number of purposes, and is excellent for a surface or seal coat. In this case the finer material is effective in improving water run-off as well as improving the scuff resistance of floorings, and the scrap rubber crumb may be supplied in the form of particles which will pass a twenty-mesh screen, and preferably a thirty-mesh screen.

A medium soft asphalt (e. g., one having from 85 to 100 penetration—ASTM—or a softening point of about 115° to 120° F.) may be used, as may a hard asphalt having a 160° to 225° F. softening point.

Best results are obtained when there is employed an asphaltic material having a softening point well above that of the soft asphalts commonly used as paving binders, e. g., about 130° F., and excessive oxidation at high temperature may be avoided by keeping the softening point below about 180° F. The asphaltic material may include various substances admixed with the asphalt to improve or modify the properties thereof.

The asphaltic coating applied on the rubber particles may be from about 0.001″ to about 0.10″ in thickness not counting penetration of the asphalt into the rubber. In general, the asphalt picked up by an individual particle should run from about one-fifth to one-half the weight of the rubber particle if fiber-free. In the case of rubber particles containing fiber, the weight ratio would be suitably increased, up to about 85 parts of asphalt being used with 100 parts of tire scrap of normal fiber content.

To further improve the scuff resistance of the play area, a top dressing of finer rubber may be used. Such material is preferably pre-treated with asphalt and/or wax, but it may be untreated. The mesh size may be twenty-mesh or finer. For best results, the crumb thirty-mesh fiber-free whole-tire scrap may be used.

In the formation of playground surfacings and other floorings, a primer coat of a dispersed asphalt such as a cut-back asphalt and/or an emulsified asphalt may be applied. For instance, cut-back asphalt, e. g., RC–1 (furol viscosity at 122° F.=75–150, residue penetration at 77° F., 100 g., 5 sec. 80–120, residue from distillation vol. percent by difference 50+) may be applied in quantities of about 0.15–0.23 gallon per square yard and allowed to cure, after which asphalt emulsion (e. g., about 0.25 gallon per square yard) is applied (e. g., 70B containing 60% + of asphalt having a penetration at 77° F. of 100–200—ASTM). When the emulsion begins to break (i. e., to separate into asphalt and water) about 2.5 pounds of the pellets of this invention are distributed over it and rolled well. Several layers of pellets and asphalt are applied until the desired thickness is obtained. In some cases cut-back asphalts have been used in place of emulsions.

It is understood that the examples illustrate the general procedure. However, many types of scrap, various asphalts, including asphalts containing rubber and/or other additive, and numerous dusting materials could be used and still fall within the scope of the invention.

One phase of the invention is to seal the vulcanized rubber crumb or ground scrap and to protect the rubber from the effect of the solvents in the cut-back asphalt. This seal is also hydrophobic and thus protects the rubber from the water phase of the asphalt emulsions. The sealing material may be asphalt or wax or other material which will act as a temporary barrier. Suggested other materials would be mineral rubber (an oxidized or blown asphalt), Gilsonite, various natural waxes, pitch, etc.

The amount of material used for treating the crumb will vary with crumb size but within the preferred range could run from 20 to 85 parts based on 100 parts of scrap vulcanized rubber crumb. The higher amounts, i. e., over 50 parts, would be desirable for scraps which contain fiber.

The softening point or the melting point of the asphalt with which the pellets are treated is advantageously somewhat higher than that of the asphalt used as a binder. The inclusion of rubber in the asphalt used as a treating material is advantageous. The inclusion of fillers (e. g., whiting and barytes) does not alter the advantage of the procedure. Such additions may be made to the treating material or to the matrix material without departing from the scope of the invention.

As above indicated, the scrap or crumb size may range from minus three-mesh to minus thirty-mesh or less in some instances, but is preferably minus eight-mesh and/or combinations of minus eight-mesh with finer materials.

The type of scrap could be any ground fiber-free vulcanized or cured scrap and/or could be scrap from any of the well known types designated as synthetic rubber as long as the scrap is capable of being ground or cut to the proper size. Cheap scrap such as hose, matting, sponge, etc., which are ordinarily rejected by the rubber reclaiming industry may also be used in certain instances.

The same processes may be applied to the provision of footpaths, the flooring of bridges, and to similar uses. Altho the construction principles in various uses are the same, various objectives may be obtained. It has long been known that a rubber surface will improve the freeze resistance of bridges; nevertheless, the problems of securing such surface to a bridge has not been solved. It is apparent that the product of this invention would be useful. In addition, extra reinforcement of the surface could be obtained by the addition of some stone. The stone would support the larger rubber particles in the mix and thus increase the resistance of the surface to heavy traffic.

The invention accordingly comprises the processes comprising the several steps and the relation and order of one or more such steps with respect to each of the others which are exemplified in the following detailed description and the scope of the application of which will be indicated in the claims.

For a fuller understanding of the nature and objects of the invention, reference should be had to the following examples as well as to the accompanying drawings, in which.

Figure 1:
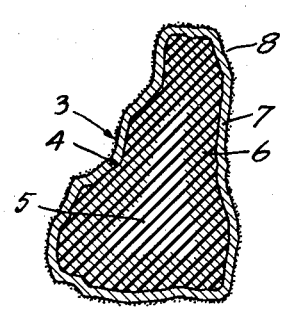
Figure 1 is a greatly enlarged transverse sectional view of a type of treated scrap vulcanized rubber pellet embodying the invention.

In Fig. 1 there is shown a pellet 3 comprising a particle of vulcanized crumb 4 having (as shown) an asphalt-free interior 5 after treatment in accordance with the invention to provide thereon a portion 6 into which asphalt has penetrated, and a coating 7 of asphalt covered with a separatively-acting coating 8 of whiting.

Figure 2:
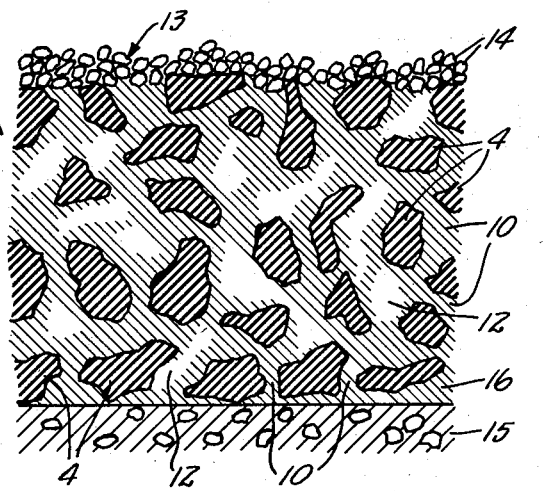
Fig. 2 is an enlarged transverse sectional view of a type of playground flooring embodying the invention.

In Fig. 2 there is shown a playground flooring comprising a mass 9 of the particles 4 of Fig. 1 which have been applied in layers between layers of asphalt 10. As shown, the layers of particles 4 and the asphalt have merged to produce the mass 9 in which there are unfilled spaces 12. The mass is surfaced at 13 with smaller particles 14 of crumb which have been treated with wax or with wax and asphalt. The mass rests on a concrete base 15 on which the lowest layer 16 of asphalt has been applied. The mass 9 may preferably be premixed and applied on the base 15 in a single layer of suitable thickness, i. e., from ¼″ to 1″, and this may then be surfaced with the finer material 14, preferably one which has been treated with a mixture of asphalt and wax.

Figure 3:
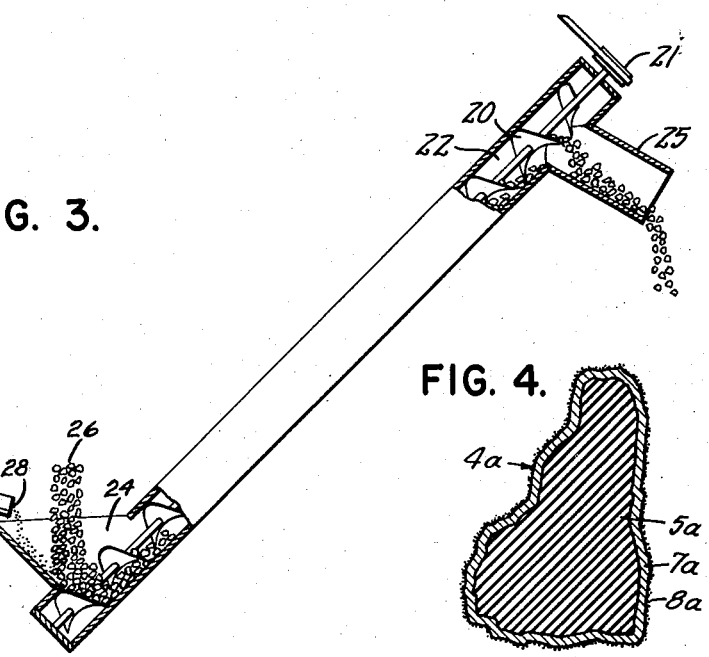
Fig. 3 is a transverse sectional view of a form of apparatus for carrying out a process of forming treated scrap vulcanized rubber pellets embodying the invention.

In Fig. 3 there is shown a screw conveyor 20 driven at 21 and having a 6″ diameter and a length of 7′ 4″ and inclined upwardly at an angle of approximately 45° inside a chamber 22 having an inlet port 24 and an outlet 25. Particles 26 of asphalt-coated vulcanized rubber crumb are introduced at 24 and a powder injected at 28 by an agitating supply-means 30, and the whole tumbled by the screw so that the asphalt-coated particles issue at 25 as powder-coated discrete particles as shown in Fig. 1.

Figure 4:
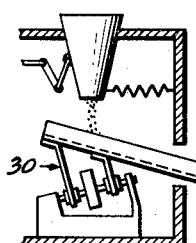
Fig. 4 is a view similar to Fig. 1 of another type of treated scrap vulcanized rubber pellet embodying the invention.

In Fig. 4 there is shown a rubber pellet which has been coated in accordance with the invention without substantial penetration of the asphalt.

The pellet 4a comprises a particle 5a of vulcanized crumb on which there has been applied a coating 7a of asphalt covered with a separatively-acting coating 8a of whiting.

EXAMPLE 1

20 lbs. of fiber-free whole-tire scrap crumb which passed a 3-mesh sieve and was retained on a 12-mesh sieve were placed in a portable concrete mixer such as used in mixing concrete for sidewalks. The mixer was maintained at about 250° F. by means of gas flames which impinge upon the barrel. The barrel is approximately 25″ in diameter at its greatest diameter. The scrap was tumbled for 15 minutes, at which time the crumb had reached approximately 150° F. Then 6.5 lbs. of 130°–140° F. (R. & B.) softening point asphalt were heated to 400° F. and added quickly to the warm crumb. The mixing was continued for 30 minutes. This mixture was then, while still warm, dumped into a screw conveyor as illustrated in Fig. 3. While the material was "churning" in the screw conveyor it was dusted with 2 lbs. of whiting. The resultant product was a free-flowing crumb. The following screen analyses show the effect of the treating:

| | Before Treating | After Treating |
|---|---|---|
| Retained on 4-mesh | 0.0 | 6.5 |
| Retained on 6-mesh | 4.8 | 22.5 |
| Retained on 8-mesh | 26.4 | 37.0 |
| Retained on 16-mesh | 63.0 | 32.2 |
| Retained on 20-mesh | 3.9 | 1.8 |
| Retained on pan | 1.9 | 0.0 |

*Processes of applying the product of Example 1*

The product of Example 1 (also identified as treated crumb) was used in treating playground surfaces as follows:

(a) The area was treated with alternate layers of RC–2 and the product of Example 1 as follows:

(1) A prime coat of 1 lb./sq. yd. of RC–1.
(2) A coat of 2 lbs./sq. yd. of RC–2.
(3) A coat of 2½ lbs./sq. yd. of treated crumb of Example 1.
(4) A coat of 2 lbs./sq. yd. of RC–2.
(5) A coat of 2½ lbs./sq. yd. of treated crumb of Example 1.
(6) A coat of 2 lbs./sq. yd. of RC2.
(7) A coat of 2½ lbs./sq. yd. of treated crumb of Example 1.

After each application of treated crumb, the area was rolled thoroly.

(b) Same as (a) except that step (6) was omitted and the top layer (7) was replaced with an application of 1 lb./sq. yd. of 30-mesh whole-tire scrap (fibre-free).

(c) The area was treated with a single layer of a mixture composed of the product of Example 1 mixed with RC–2 cutback applied as follows:

(1) A prime coat of 1 lb./sq. yd. of RC–1.
(2) 0.7 lb. of RC–2 heated to 150° F. were added to 3.5 lbs. of the product of Example 1 or 20% (of the weight of the crumb) of RC–2 and mixed thoroly with a trowel. This mixture was then placed on ½ sq. yd. of primed surface and raked level and rolled thoroly.

(d) Same as method of application (c), using:

100 parts treated crumb by wt.
20 parts whiting by wt.
25 parts RC–2 cutback by wt.

(e) Same as method of application (c), using:

100 parts treated crumb by wt.
40 parts whiting by wt.
25 parts RC–2 cutback by wt.

(f) Same as method of application (c), using:

100 parts treated crumb by wt.
60 parts whiting by wt.
25 parts RC–2 cutback by wt.

EXAMPLE 2

300 grams of fiber-free whole-tire scrap which passed an 8-mesh sieve and was retained on a 20-mesh sieve were added to a hot (about 220° F.) steam-jacketed ½-gallon Baker-Perkins mixer. This scrap was tumbled for 15 minutes, at which time the crumb had reached a temperature of about 140° F. There was then added to the warm crumb 100 grams of a filled rubber-asphalt blend mixed with 300 grams of whiting as filler and preheated to 400° F. The rubber asphalt blend may be prepared by adding 30 grams of powdered rubber, at least 70% of which will pass a 5-mesh screen (such, for example, as described in the copending application of Benjamin Wendrow, Serial No. 326,933, filed December 19, 1952, now patent No. 2,767,149, or in the article of D. S. Le Beau in pages 785–791 Rubber Age, vol. 73, No. 6, September 1953), to 300 grams of 130°–140° F. (R. & B.) softening point asphalt and mixing with a marine type mixer (Lightnin) for 30 minutes at 400°–450° F.

The crumb, the rubber-asphalt blend, and the whiting were mixed together for 30 minutes. This mixture was then dusted with whiting (about 200 grams) while still hot in the Baker-Perkins mixer. The resultant product was a free-flowing crumb.

EXAMPLE 3

Two fibre-free whole-tire scraps of different sieve sizes, 150 grams —8 +20-mesh and 150 grams —20 +30-mesh, were mixed together with 200 grams of filled rubber-asphalt and powdered with 130 grams of whiting, using same procedure as in Example 2.

EXAMPLE 4

Two fiber-free whole-tire scraps of different sieve sizes, 100 grams —8 +20-mesh and 200 grams —20 +30-mesh, were mixed together with 200 grams of filled rubber-asphalt and powdered with 130 grams of whiting as in Example 2.

EXAMPLE 5

300 grams of fibre-free whole-tire scrap which passed an 8-mesh sieve and was retained on a 20-mesh sieve were added to a hot (about 220° F.) Baker-Perkins mixer. This scrap was tumbled for 15 minutes, at which time the crumb had reached about 140° F. Then 100 grams of prepared rubber-asphalt blend were heated to 400° F. and added to the warm crumb. The mixing was continued for 30 minutes. This mixture was then dusted with whiting (about 200 grams) while still hot in the Baker-Perkins mixer. The resultant product was a free-flowing crumb.

The rubber-asphalt blend used for treating the crumb was prepared in the following manner: 30 grams of powdered rubber (as in Example 2) were added to 300 grams of 130°–140° softening point asphalt (R. & B.) and mixed with a marine type mixer (Lightnin) for 30 minutes at 400°–450° F.

EXAMPLE 6

450 grams of fiber-free whole-tire scrap which passed an 8-mesh sieve and was retained on a 20-mesh sieve were added to a heated (220° F.) Baker-Perkins mixer. Procedure same as Example 2, but using 100 grams of 130°–140° (R. & B.) softening-point asphalt and 200 grams of whiting for dusting.

EXAMPLE 7

Using same procedure as Example 2, a free-flowing crumb was made, using 400 grams of fibre-free whole-tire scrap (—8 +20-mesh) coated with 100 grams of 170° (R. & B.) softening-point asphalt, and 130 grams of barytes were used for dusting.

EXAMPLE 8

Using the same procedure as Example 2, a free-flowing crumb was made, using 300 grams of fiber-free whole-tire scrap coated with 100 grams of 170° (R. & B.) softening-point asphalt and powdered with 150 grams of barytes.

EXAMPLE 9

300 grams of fiber-free whole tire-scrap which passed an 8-mesh sieve and was retained on a 20-mesh sieve, and 150 grams of fibre-free whole-tire scrap which passed a 30-mesh sieve and was retained on a 40-mesh sieve, were mixed with 150 grams of 130°–140° (R. & B.) softening-point asphalt and dusted with from 200 to 250 grams of barytes, using the same procedure as Example 2.

EXAMPLE 10

20 lbs. of fiber-free whole-tire scrap (—30 +40 mesh) were added to a heated concrete mixer (250° F.). This scrap was tumbled for 15 minutes, at which time the crumb had reached approximately 150° F. 6.5 pounds of 155° melt-point micro-wax (microcrystalline wax, which is extracted from heavy—high-viscosity—fractions of crude petroleum and which is a solid, amorphous-appearing material ranging in color from white to brown, crystal size very small compared to paraffin wax, which has a large crystal, melting point range 155–197° F.—good results are secured with the brown product melting at 155° F.) were heated to 400° F. and added quickly to the warm crumb. The mixing was continued for 30 minutes. The mixture was dusted with 4 pounds of whiting. The resultant product was a free-flowing crumb which can be used to provide a particularly fine or smooth top surfacing, i. e., a seal coat, for playgrounds.

Processes of application (a) The area was treated with a single layer of a mixture composed of the products of Example 1 and Example 10 mixed with RC–2 cutback applied on a prime layer as follows:

(1) A prime coat of 1 lb./sq. yd. of RC–1.

(2) 0–8 lbs. of RC–2 heated to 150° F. were added to a mixture of 3 lbs. of product of Example 1 and 1 lb. of the product of Example 10 and mixed (100 parts of treated crumb, 20 parts RC–2) thoroly with a trowel. This mixture was then applied on ½ sq. yd. of the primed surface and raked level and rolled thoroly.

(b) Same as method of application (a) except that the RC–2 was 15 parts to 100 parts of the mixed-treated crumb by weight.

(c) Same as method of application (a) except that the RC–2 was 25 parts to 100 parts of the mixed-treated crumb by weight.

(d) Same as method of application (a), but used 363 grams 70B asphalt emulsion (20% by weight of total crumb).

SIEVE ANALYSIS OF SCRAP RUBBER AND PRODUCT OF EXAMPLE 10

|  | Before Coating | After Coating |
|---|---|---|
| Retained on 18-mesh | 0.0 | 6.0 |
| Retained on 20-mesh | 0.0 | 4.3 |
| Retained on 25-mesh | 0.0 | 7.5 |
| Retained on 30-mesh | 12.5 | 13.5 |
| Retained on 40-mesh | 50.5 | 31.1 |
| Retained In Pan | 37.0 | 37.6 |
|  | 100.0 | 100.0 |

EXAMPLE 11

600 grams of fiber-free whole tire scrap (—8 +30-mesh) were added to a heated Baker-Perkins mixer (220° F.). This scrap was tumbled for 15 minutes, at which time the crumb had reached approximately 150° F. 200 grams of 155° melt-point micro-wax were heated to 400° F. and added quickly to the warm crumb. The mixing was continued for 30 minutes. The mixture was dusted with 150 grams of whiting. This resultant product was a free-flowing crumb.

EXAMPLE 12

20 lbs. of fiber-free whole-tire scrap as used in Example 1 (−3 +12-mesh) were mixed with 10 lbs. of 130°–140° (R. & B.) softening-point asphalt, using the procedure of Example 1. 3½ lbs. of whiting were required to obtain a free-flowing crumb.

Process of application was the same as Example 1(a).

EXAMPLE 13

14 lbs. of whole-tire scrap (−3+12-mesh) with only 55% of the fiber removed, to provide a scrap containing 6.7% fiber, were mixed with 10 lbs. of 130°–140° (R. & B.) softening-point asphalt, using procedure of Example 1. 4 lbs. of whiting were required for dusting to obtain a free-flowing crumb.

Processes of application were the same as Example 1.

EXAMPLE 14

300 grams of −8 +20-mesh crumb were added to a hot Baker-Perkins mixer (220° F.). This scrap was tumbled for 15 minutes, at which time the crumb had reached approximately 150° F. 100 grams of 155° melt-point micro-wax were heated to 300° F. and added quickly to the warm crumb. The mixing was continued for 30 minutes. The mixture was dusted with 150 grams of whiting. The resultant product was a free-flowing crumb.

EXAMPLE 15

A surface material suitable for sealing the voids and improving the appearance of the playground surface can be made from 30-mesh fiber-free whole-tire scrap (−30 mesh) by treatment with a 50/50 mixture of 130°–140° softening point asphalt and micro-wax (as described in Example 10). 20 lbs. of ground whole-tire fiber-free scrap is mixed in a concrete mixer warmed to approximately 150° F. 6.5 lbs. of a 50/50 mixture of micro-wax (150° F. melting point) and 130°–140° softening point asphalt were heated to 400° F. and quickly added to the warm crumb. The mixing was continued for 30 minutes and then the material was dusted with 4 lbs. of ground limestone (whiting). The resulting product is an excellent material for filling surface voids in play areas such as described in the examples of this application. The wax is effective in retarding deterioration due to sunlight.

EXAMPLE 16

600 lbs. of whole-tire scrap (minus 3 to plus 12-mesh size) were placed in a 700-gallon mixer (Ross) having twelve blades rotating at 30 R. P. M. and steam-jacketed for 15 pounds per square inch, which was maintained at about 200°–250° F. The rubber scrap was agitated for 10 minutes at which time its temperature was 130° to 140° F. 180 lbs. of 130°–140° (R. & B.) softening-point asphalt were added from a supply tank maintained at 400° F. The mixing action was very good and was continued for 5 minutes. The treated rubber scrap was then dumped into a hopper and fed to a screw conveyor where it was dusted with ground limestone (whiting) to prevent re-agglomeration. The product was then ready for use for playground surfacing.

Process of application

The product of Example 16 can preferably be applied by a premix process as described below:

The area to be coated is first swept clean and the temperature of the surface is preferably above 60° F. The surface is first treated with 2 lbs. per square yard of RC-1 using a window-washing squeegee for spreading. The product of Example 16 is then mixed with RC-1 in a 6 cu. ft. concrete mixer in the proportion of 50 lbs. of the product of Example 16 to 17 lbs. of RC-1. This is mixed for 2 minutes. Most satisfactory results are obtained when the mixer is tilted to about 15° or at least to a position closer than the 30° to horizontal commonly used for mixing concrete. The mixed material is quickly spread to the desired thickness, usually about ½" or 10–20 lbs. per square yard. A convenient method is to use a board as a screed with two boards as guides. After three hours the material may be rolled with a roller no larger than 4 tons. After the first rolling the 30-mesh material of Example 15 is brushed on the surface and a second rolling is given. The result is a very satisfactory playground surface of good appearance and free from loose material.

EXAMPLE 17

100 parts of defiberized whole-tire scrap ground to between minus 3 and plus 12 mesh size are mixed with 60 parts of RC-2 and applied as a playground surfacing material, in the manner explained in Example 16.

EXAMPLE 18

A bridge surfacing consisting of a hot mix of 26 parts by weight of ⅛"–¼" stone, 7 parts of the treated rubber of Example 16, and 3 parts of 85–100 penetration paving asphalt (softening point 115°–120° F.) is mixed, and put down at 300° F. A resilient and effective surfacing is provided for application to exposed bridge surfaces.

Since certain changes may be made in carrying out the above processes, and different embodiments of the invention may be provided without departing from the scope of the invention, it is intended that all matter contained in the above description or shown in the accompanying drawing shall be interpreted as illustrative and not in a limiting sense.

I claim:

1. The process of forming a flooring which comprises substantially sealing the surfaces of discrete particles of vulcanized rubber of a size which will pass a three-mesh screen and the major portion of which will be retained on a sixteen-mesh screen and substantially all of which will be retained on a twenty-mesh screen with a melted asphaltic material having a softening point of from 130° F. to 180° F., applying the sealed particles and a binder asphaltic material over a surface; said binder asphaltic material having a penetration at 77° F. of from 80 to 200 and having a softening point substantially lower than the softening point of the first-mentioned asphaltic material, and compacting the materials on the surface, whereby tendencies for the particles to absorb the binder asphaltic material and thereby weaken the flooring are reduced.

2. A process as set forth in claim 1 wherein there is applied to the particles of vulcanized rubber from about 20% to about 85% by weight of the melted asphaltic material.

3. A process as set forth in claim 1 wherein a particle-separating powder is applied to the sealed particles after they are sealed by the melted asphaltic material.

4. A process as set forth in claim 1 wherein a top dressing of particles of vulcanized rubber which are of a size which will pass a twenty-mesh screen and which are sealed with material of the class consisting of waxy and bituminous materials having a softening point of from about 130° F. to about 180° F. is applied to the upper surface of the flooring.

References Cited in the file of this patent

UNITED STATES PATENTS

| | | |
|---|---|---|
| 2,035,437 | Stam | May 24, 1936 |
| 2,053,281 | Gaiennie | Sept. 8, 1936 |
| 2,138,734 | Dussek | Nov. 29, 1938 |
| 2,215,435 | Hale | Sept. 17, 1940 |
| 2,347,233 | Abernathy | Apr. 25, 1944 |
| 2,767,149 | Wendrow | Oct. 16, 1956 |
| 2,779,745 | Howland | Jan. 29, 1957 |

FOREIGN PATENTS

| | | |
|---|---|---|
| 388,341 | Great Britain | Feb. 23, 1933 |
| 510,261 | Great Britain | July 31, 1939 |
| 113,858 | Australia | Sept. 12, 1941 |

UNITED STATES PATENT OFFICE
CERTIFICATE OF CORRECTION

Patent No. 2,871,774                                                   February 3, 1959

Thomas A. Johnson

It is hereby certified that error appears in the printed specification of the above numbered patent requiring correction and that the said Letters Patent should read as corrected below.

Column 6, line 37, for "0-8 lbs." read — 0.8 lbs. —.

Signed and sealed this 19th day of May 1959.

(SEAL)
Attest:

KARL H. AXLINE                                                      ROBERT C. WATSON
Attesting Officer                                              Commissioner of Patents